(12) United States Patent
Backus et al.

(10) Patent No.: US 11,209,717 B2
(45) Date of Patent: Dec. 28, 2021

(54) TWO-COLOR WAVE MIXING UPCONVERSION IN STRUCTURED WAVEGUIDES

(71) Applicant: Kapteyn-Murnane Laboratories, Inc., Boulder, CO (US)

(72) Inventors: Sterling J. Backus, Erie, CO (US); Henry C. Kapteyn, Boulder, CO (US); David G. Winters, Erie, CO (US)

(73) Assignee: Kapteyn-Murnane Laboratories, Inc., Boulder, CO (US)

( * ) Notice: Subject to any disclaimer, the term of this patent is extended or adjusted under 35 U.S.C. 154(b) by 0 days.

(21) Appl. No.: 16/954,115

(22) PCT Filed: Dec. 14, 2018

(86) PCT No.: PCT/US2018/065862
§ 371 (c)(1),
(2) Date: Jun. 16, 2020

(87) PCT Pub. No.: WO2019/118934
PCT Pub. Date: Jun. 20, 2019

(65) Prior Publication Data
US 2021/0018816 A1    Jan. 21, 2021

Related U.S. Application Data

(60) Provisional application No. 62/671,226, filed on May 14, 2018, provisional application No. 62/598,909, filed on Dec. 14, 2017.

(51) Int. Cl.
*G02F 1/35* (2006.01)
*G02F 1/39* (2006.01)

(52) U.S. Cl.
CPC ............ *G02F 1/3536* (2013.01); *G02F 1/395* (2013.01); *G02F 1/354* (2021.01); *G02F 1/392* (2021.01)

(58) Field of Classification Search
None
See application file for complete search history.

(56) References Cited

U.S. PATENT DOCUMENTS 7,295,739 B2 * 11/2007 Solarz ................ G01N 21/8806
                                                      359/285
10,128,631 B2 * 11/2018 Popmintchev ............ H01S 4/00
(Continued)

FOREIGN PATENT DOCUMENTS

EP         3805857 A1 *  4/2021   ......... G03F 7/70008

OTHER PUBLICATIONS

A. Husakou, S. -. Im and J. Herrmann, "Generation of 5-fs pulses tunable from 400 to 120 nm by kagome-lattice hollow-core PCF," CLEO/QELS: 2010 Laser Science to Photonic Applications, 2010, pp. 1-2, doi: 10.1364/QELS.2010.QTuG3. (Year: 2010).*

(Continued)

*Primary Examiner* — Rhonda S Peace
(74) *Attorney, Agent, or Firm* — Macheledt Bales LLP; Jennifer L. Bales (57) ABSTRACT

Apparatus and methods for generating controllable, narrow-band radiation at short wavelengths, driven by two colors injected into a structured waveguide. The use of multicolor excitation with the structured waveguide allows the use of very small guided beam diameters, without damaging the waveguide. Reduced guided wave mode area combined with low intensities required to drive wave-mixing frequency conversion allow the use of very compact, high average power, moderate peak intensity femtosecond fiber laser technology to drive useful conversion efficiency of laser light into the deep-UV and vacuum-UV at MHz repetition rates.

34 Claims, 4 Drawing Sheets

(56) References Cited

U.S. PATENT DOCUMENTS

| | | | |
|---|---|---|---|
| 10,243,319 B1* | 3/2019 | Keyser | H01S 3/094003 |
| 2016/0124144 A1* | 5/2016 | Benabid | G02B 6/02328 |
| | | | 385/125 |
| 2021/0018816 A1* | 1/2021 | Backus | G02F 1/395 |

OTHER PUBLICATIONS

M. K. Mridha, D. Novoa, S. T. Bauerschmidt, A. Abdolvand, and P. S. J. Russell, "Generation of DUV/VUV Raman Frequency Comb via Molecular Modulation in a H2-filled Kagomé-PCF," in Conference on Lasers and Electro-Optics, OSA Technical Digest (online) (Optical Society of America, 2016), paper FM4A.7. (Year: 2016).*

"Ultrashort light pulses in hollow waveguides", A.M. Zheltikov, Physics-Uspekhi, 2002.

"High harmonic generation in a gas-filled hollow-core photonic crystal fiber", Heckl et al., Appl Phys B, 2009.

"Ultrabroadband phase-matched optical parametric generation in the ultraviolet by use of guided waves", Optics Letters, 1997.

"Laser technologies for ultrasensitive groundwater dating using long-lived isotopes", U.S. Department of Energy Phase 1 report, Mar. 8, 2016.

"Phase-Matched Optical Parametric Conversion of Ultrashort Pulses in a Hollow Waveguide", Durfee et al.

"Phase-matched optical parametric conversion of ultrashort pulses in a hollow waveguide", Durfee et al., AIP Conference proceedings, 1998.

"Generation of Broadband VUV Light Using Third-Order Cascaded Processes", Misoguti et al., Physical Review Letters 2001.

"Phase matching in cascaded third-order processes", Durfee et al., J. Opt. Soc. Am. B, 2002.

"Nonlinear optics in Xe-filled hollow-core PCF in high pressure and supercritical regimes", Appl. Phys. B, Azhar et al., 2013.

"Phase-matched waveguide four-wave mixing scaled to higher peak powers with large-core-area hollow photonic-crystal fibers", Konorov et al., Physical Review E, 2005.

"Enhanced four-wave mixing in a hollow-core photonic-crystal fiber", Optics Letters, 2003.

"Hollow-core photonic-crystal fibers optimized for four-wave mixing and coherent anti-Stokes Raman scattering", Journal of Raman Spectroscopy, Konorov et al., 2003.

"Nonlinear Optics with Photonic-Crystal Fibres", Zheltikov, 2007.

"Hollow-core photonic crystal fibres for gas-based nonlinear optics", Russell et al., Nature Photonics, 2014.

* cited by examiner

TWO-COLOR WAVE MIXING UPCONVERSION IN STRUCTURED WAVEGUIDES

BACKGROUND OF THE INVENTION

Field of the Invention

The present invention relates to wave-mixing upconversion in waveguides. In particular, the present invention relates to the generation of controllable, narrowband radiation at short wavelengths by two-color wave-mixing upconversion in structured waveguides.

Discussion of Related Art

Scientific advances—in particular advances in nanotechnology-present expanding applications and opportunities for the use of coherent light at short wavelengths, extending from the ultraviolet into the x-ray region of the spectrum. A variety of applications make use of distinctive characteristics of candidate light sources:

1. Imaging resolution is limited by wave diffraction effects. This is true for both conventional imaging systems as well as "super-resolution" imaging techniques. The use of short-wavelength light thus makes possible imaging at few-nanometer resolution. New techniques, broadly characterized as Coherent Diffractive Imaging (CDI) techniques, also make use of the coherence of illumination to enable nano-imaging.

2. Nonimaging techniques, broadly characterized as "scatterometry" are used extensively for detection of sub-wavelength size defects in semiconductor manufacture. However, the difficulty of detection of small defects scales correlates strongly with the ratio of defect size to illumination wavelength, motivating the use of short-wavelength illumination.

3. Short wavelength lasers are also used for precision machining. Industrial applications to-date have been limited to the use of (pulsed) ultraviolet lasers that can focus to high intensity and small spot size. However, deep-UV, VUV, and EUV laser sources also have potential for ultra-precise machining.

4. Other techniques make use of the ionizing nature of light in the vacuum-ultraviolet (VUV), extreme-ultraviolet (EUV) and X-ray regions of the spectrum for techniques of photoelectron and photoion spectroscopy, including for-example Angle Resolved Photoemission (ARPES) for characterization of the band structure of materials. Other techniques such as photovoltage spectroscopy, photoemissive probing of circuit voltage, and photoelectron emission microscopy (PEEM) can make use of both the short wavelength and the photoionizing nature of a coherent short-wavelength light source.

Further source characteristics that can be useful for specific applications include the use of pulsed sources for time-resolved (stroboscopic or single-shot) illumination of dynamics, which can include imaging, scatterometry, and photoemission probing. Specifically, pulsed short-wavelength light sources based on the high-order harmonic generation process have increasingly found application in probing dynamics on femtosecond and even attosecond time-scales.

Another often-critical light source characteristic is the spectral bandwidth of the source. CDI typically benefits from a source with a narrow (i.e. $\lambda/\Delta\lambda>\sim10$) spectral bandwidth, so that interference effects can be clearly seen. Other limitations originate from the optics used in these systems. For example, focusing of short wavelength light using either refractive optics (in the VUV spectral region) or a diffractive zone plate (for EUV/x-rays) are both highly chromatic and require a narrow (sometimes $\lambda/\Delta\lambda>\sim1000$) bandwidth to obtain an optimum focal spot. High-resolution angle-resolved photoemission is a major application of short-wavelength light sources and it requires a very narrow spectral bandwidth since the energy resolution of the measurement is limited by the spectral bandwidth of the source. Often, emergent properties in the electronic structure of a material, such as superconductivity, can be observed only with very high energy-resolution, <10 meV or <1 meV in some cases. Furthermore, since space-charge repulsion effects limit the amount of ionization per laser pulse photoemission experiments are optimized by using a narrowband source with a low energy per pulse and a correspondingly high pulse repetition rate (or continuous-wave) to maintain data acquisition rate.

Another application that can benefit from high repetition-rate is Atom Probe Tomography. APT is a method by which a nanoscale-size sample can be imaged, virtually in its entirety and with atomic level resolution, by disassembling the sample a few atoms at a time and identifying each atom's mass (i.e. element specificity) and initial location in the sample. Short-wavelength visible and UV pulsed lasers have been used to initiate the atom desorption process, a few atoms with each laser pulse. The use of VUV and EUV light is being investigated as a means for stimulating this desorption while avoiding heating effects that can limit data fidelity.

Past work in generating coherent short-wavelength light generally has used high-pulse-energy, kHz-repetition-rate lasers as the energy source either for powering a laser transition or for coherent nonlinear optical upconversion. Specifically, use of the high-order harmonic generation process in conjunction with ultrashort-pulse Ti:sapphire lasers has made it possible to implement coherent VUV to EUV sources on a tabletop-scale operating at kHz repetition-rates.

The concept of combining nonlinear upconversion of intense laser pulses in a gas medium with the use of a waveguide geometry has been described in work by some of the current inventors. Specifically, Durfee et al., Rundquist et al. outline the use of hollow capillary waveguides for both four-wave mixing and high-order harmonic generation that implement phase-matched upconversion in two cases: 1) wave-mixing upconversion where the nonlinear medium is not ionized, and 2) for high-order harmonic generation when the medium generally is at-least weakly ionized. Further work on high-order harmonic generation in free-space and waveguide geometries, and the scaling of phase matching with the wavelength of the driving laser, is outlined in the work of Popmintchev et al. The concept that wave-mixing interactions can be cascaded to generate shorter VUV wavelengths was introduced in the work of Misoguti.

Figure 1:
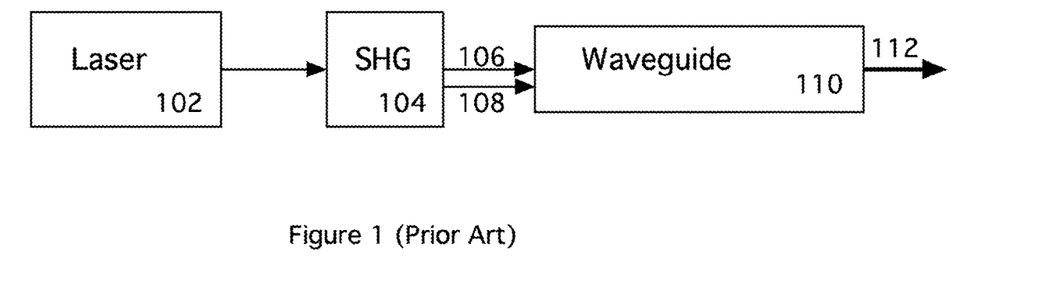
FIG. 1 (Prior Art) is a schematic diagram illustrating the process of upconverting laser light by color mixing in a waveguide.

All the aforementioned work used simple hollow capillary tubes as a waveguide to confine both the driving laser light and the gas used as the nonlinear medium. FIG. 1 (Prior Art) is a simplified diagram of two-color wave mixing in a waveguide. Light from laser 201 is frequency double in a second harmonic generation element 104. Both light at the original frequency from laser 102 and frequency-doubled light 108 are mixed in hollow waveguide 110, to produce output light 112. Past experimental work upconverted laser light into the deep-UV in gas-filled waveguides. Two colors of light 106, 108 were focused into a ~100-200 µm diameter waveguide 110, and a four wave mixing process then upconverted light. This process can be fully phase-matched by balancing waveguide and gas dispersion. Femtosecond laser pulses at ~266 nm were generated by injecting light at 400 nm and at 800 nm from a ti:sapphire laser 102 into the waveguide 110, converting up to 40% of the 400 nm light 108 to 267 nm output light 112. Subsequent work showed that this process was efficient enough to be cascaded; i.e. the generated light was sufficiently intense as to be use in a subsequent upconversion step.

Other past work has proposed and attempted to implement high-order harmonic generation in hollow structured waveguides, and has also implemented the generation of very broadband VUV light in these structured waveguides through a four-wave mixing process. However, in the former case, the scheme was found to be unreliable because the required intensities for high-harmonic generation also made the structured waveguide susceptible to damage. In the latter case, the broadband VUV light is less useful for many applications than is a narrowband emission as demonstrated here.

A need remains in the art for apparatus and methods for generating controllable, narrow-band radiation at short wavelengths, driven by two colors injected into a structured waveguide. A structured waveguide is a hollow waveguide with internal structures designed to suppress loss for light propagation. The use of a structured waveguide makes it possible to suppress diffraction loss in the waveguide, which otherwise increases rapidly with smaller ratio of mode-area to wavelength in a simple capillary waveguide. The structured waveguide suppresses this loss; thus, it can be implemented using a smaller laser mode, decreasing the threshold pulse energy for the four-wave mixing upconversion. The lower pulse energy also suppresses potential instabilities such as self-focusing of the light. Furthermore, this in-turn allows for upconversion with a new class of lasers that product high peak-power ultrashort pulses at much higher-MHz and higher-repetition rates (but lower pulse energies). Finally, the superior confinement while still maintaining a small mode area enables four-wave mixing upconversion in a multiply-cascaded process; i.e. where one step of upconversion generates light used in a subsequent upconversion step—the new light of which can be used to drive yet another upconversion step (and so on). This multistep upconversion allows us to generate light at unprecedented short wavelength in the vacuum-ultraviolet, starting only with visible/near infrared light and using a small-scale laser setup. This multistep conversion has not been observed previously. Furthermore, most-remarkably, this multistep conversion has proven to be able to retain a very narrow spectral bandwidth of individual upconverted spectral peaks, and to be very robust against high-power laser damage of the waveguide. Finally, it also allows for the generation of beams of short-wavelength light with excellent spatial mode quality; i.e. near gaussian.

SUMMARY OF THE INVENTION

It is an object of the present invention to provide apparatus and methods for generating controllable, narrow-band radiation at short wavelengths, driven by two colors injected into a structured waveguide.

The present invention makes a substantial step forward in the general technology shown in FIG. 1, by making it possible to generate coherent VUV with controlled spectral bandwidth, at much higher repetition-rates using a much more compact driving laser technology. This greatly increases the utility of the technology. The present invention uses two colors to drive a wave-mixing upconversion process—generally cascaded four-wave mixing—with pulses of a peak intensity that is well within the range that can be reliably guided, even in recently developed structured waveguide geometries. The use of multicolor excitation with the structured waveguide allows the use of very small guided beam diameters, without damaging the waveguide. The reduced guided wave mode area enabled by these waveguides, combined with the reduced intensities required to drive wave-mixing frequency conversion (as opposed to high-order harmonic generation or supercontinuum generation), allow the use of very compact, high average power, moderate peak intensity femtosecond fiber laser technology to drive useful conversion efficiency of laser light into the deep-UV and vacuum-UV even at MHz repetition rates.

Some embodiments use pressure gradients within the frequency conversion waveguide, that serve to successively phase-match subsequent stages of upconversion in the cascade, as the laser propagates through the waveguide, upconverting first into the UV, then the deep-UV and finally the VUV. The pressure gradient can be controlled by changing the pressure of the gas at the input and/or output side of the fiber, as well as the length of the fiber, with the output of the fiber in vacuum. Further control is possible by pressurizing the output side of the fiber as well, with the same or a different gas, so long as this gas does not substantially absorb the generated colors of interest. Some embodiments generate further harmonics, e.g. 3ω in place of 2ω, or a tunable source such as an optical parametric amplifier (OPA) driven by the 1ω or 2ω laser, to generate one or both of the colors injected into the waveguide. Useful gases include krypton and argon.

The present invention provides methods and apparatus for upconverting light by wave-mixing within a hollow waveguide fabricated with internal structure designed to suppress loss for light propagation. Time-coincident injection of two coherent light inputs into the waveguide is accomplished. The two inputs have distinct colors. The ratio of waveguide diameter to wavelength of the longer-wavelength color of coherent light input is less than 100. The coherent light inputs are selected with wavelengths and peak power sufficient to result in frequency upconversion resulting in output light having a higher wavelength than either of the input light wavelengths and having intensity of at least 5% of the coherent light inputs combined intensities.

In some preferred embodiments the coherent light inputs are chosen to result in cascaded upconversion. The cascaded upconversion can have multiple tiers such that the output light is several times shorter in wavelength than the wavelength of the shorter-wavelength color of coherent light input. One or both of the two coherent inputs may be pulsed, for example with pulse durations of over 100 femtoseconds, or over 1 picosecond. The pulse energy is might be less than 10 microjoules. The pulse repetition rate may be 0.5 MHz or greater. The pulses may be chirped.

In some embodiments, each coherent light input possesses peak intensity and average power low enough to avoid damage to the waveguide, and both colors of coherent light input must be present to drive the frequency upconversion process at an efficiency of at least 5%.

The output light may comprise coherent vacuum-ultraviolet (VUV) coherent emission with spectral bandwidth between 10 meV and 100 meV. The coherent light inputs may propagate in the waveguide in their lowest-order, near-gaussian spatial modes, and the output light may also be low-order near-gaussian mode.

Some embodiments include a mechanism for maintaining the gas in the waveguide at a pressure gradient along the length of the waveguide, for example by providing holes in the waveguide for inserting gas. or by injecting a gas at an entrance of the waveguide and injecting a different gas at an exit of the waveguide. It is helpful to hold the waveguide straight in order to avoid bending losses.

DETAILED DESCRIPTION OF THE INVENTION

Figure 2A:
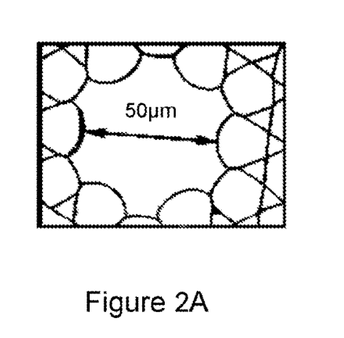
FIG. 2A is a side cutaway view of a first kagome structured waveguide. The black corresponds to where material is present (generally a glass, or silica), while the white corresponds to empty space.
Figure 2B:
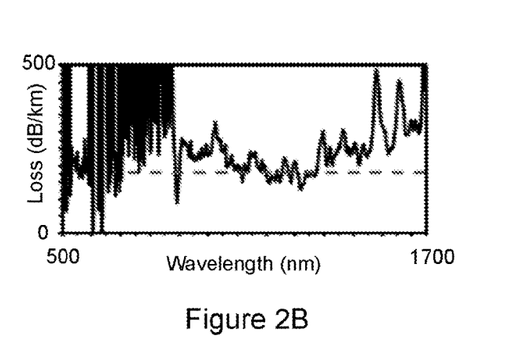
FIG. 2B is a plot showing loss coefficient over wavelength in the waveguide of FIG. 2A which is demonstrates dramatically lower loss that a simple capillary tube would.

FIG. 2A is a side cutaway view of a first kagome structured waveguide. FIG. 2B is a plot showing loss coefficient over wavelength in the waveguide of FIG. 2A, demonstrating low loss at ~0.55 μm and 1-1.3 μm. In a one meter section, a loss of 0.18 dB is effectively full guiding. Rapid progress is being made in lowering losses. used for delivery of high-power 1 μm light for ultrafast laser micromachining applications. More than 36 W average power in picosecond pulses has been propagated through this design of fiber.

Figure 2C:
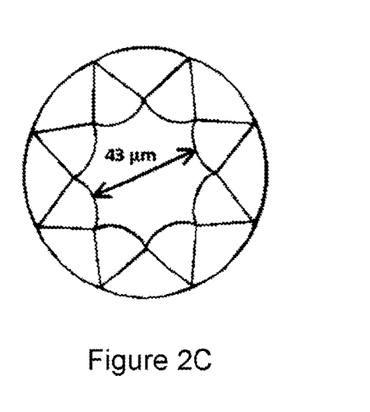
FIG. 2C is a side cutaway view of a second design of kagome structured waveguide.

FIG. 2C is a side cutaway view of a second design "kagome" structured waveguide used for delivery of high-power 1 μm light for ultrafast laser micromachining applications. More than 36 W average power in picosecond pulses has been propagated through this fiber.

Figure 2D:
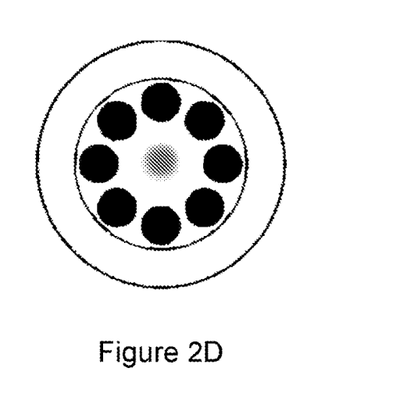
FIG. 2D is a diagram of electromagnetic modeling of a near-guassian propagating mode in third design of "negative curvature" fiber—the electromagnetic mode is centered in the waveguide, as a well-behaved propagating beam with minimal intensity overlap with the structure of the negative curvature waveguide.

FIG. 2D is a diagram of electromagnetic modeling of a near-gaussian propagating mode in a "negative curvature" fiber. The shaded area in the center corresponds to the laser made, which is a well-behaved gaussian shape with minimal intensity overlap with the guiding structure. In the negative curvature fiber, the rings surrounding the central mode can either touch each other, or not, depending on the design.

In a preferred embodiment, a KMLabs "Y-FI HP Ultra" ultrashort-pulse fiber laser-amplifier system 100 generates pulses with energy 5-50 μJ, having ~100-200 fs duration, at repetition rates from 500 kHz to 10 MHz, and average power up to 70 W. This laser is based on the KMLabs Y-Fi HP laser, capable of generating up to 5 μJ, sub-200-fs pulses at up to 5 MHz (25 W), in the infrared at a center wavelength of nominally ~1035 nm. A second embodiment adds a further amplifier consisting of a large mode-area rod-type photonic crystal fiber that increases both the footprint and average power capability of the laser. Other types of laser media and laser amplifier designs can also be used.

Figure 3A:
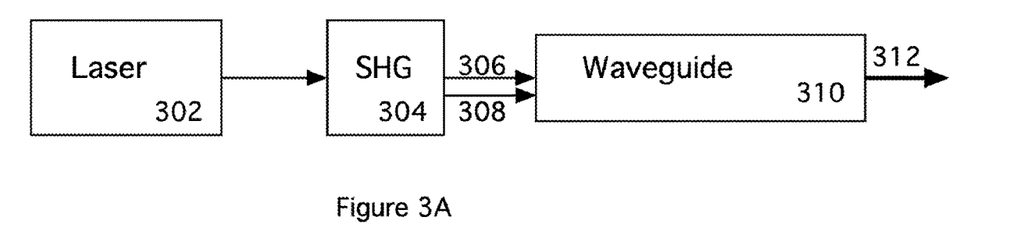
FIG. 3 is a block diagram of two-color wave-mixing upconversion in structured waveguides according to the present invention.
Figure 3B:
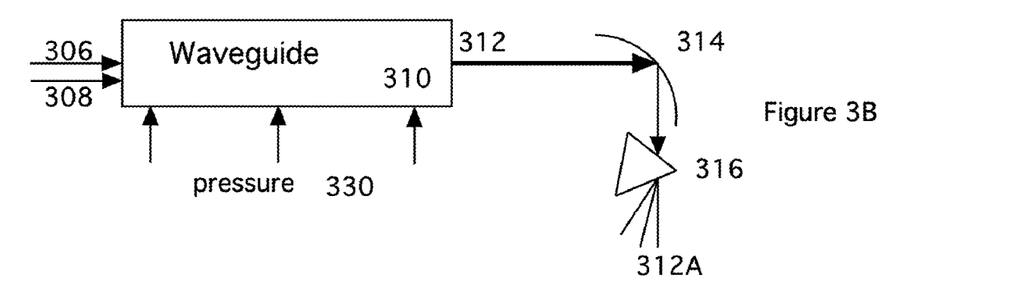
Figure 3C:
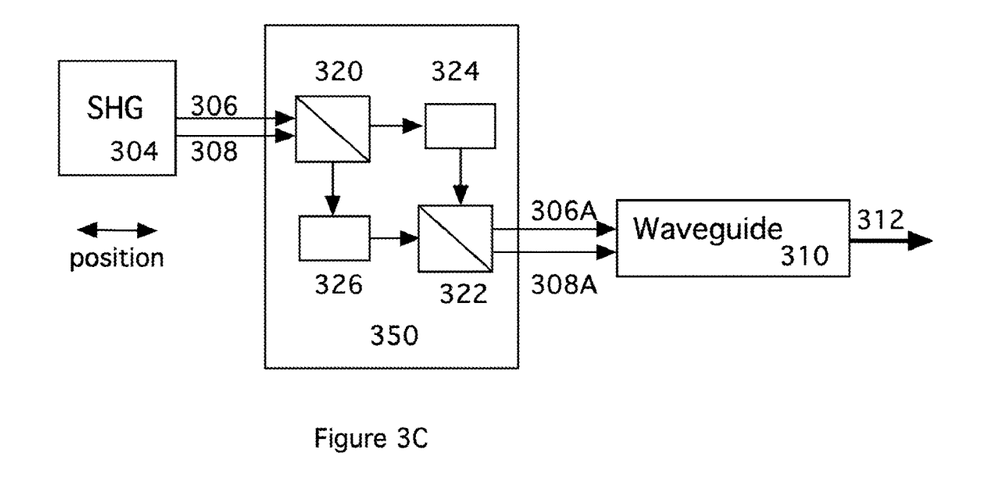

FIGS. 3A-3C are examples of two-color wave-mixing upconversion in structured waveguides according to the present invention. In system of FIG. 3A, the output of the Y-Fi HP Ultra laser is frequency-doubled with efficiency that can approach 70%, providing >30 W light with spectrum at ~518 nm, and a pulse duration that can be substantially shorter than the driving laser (<100 fs in some cases). The doubling efficiency can be varied using crystal position, with less efficient doubling being preferred in certain scenarios to maintain the focusability and pulse quality of the depleted fundamental. Chromatic beam splitters may be used in a Mach-Zehnder geometry (see FIG. 3C) to split the two colors, condition each separately, then recombine for focusing into the hollow waveguide. This setup makes it possible to adjust the relative timing as well as the collimation properties of the beams separately, to optimize coupling and conversion efficiency. Other approaches such as use of birefringent materials to adjust relative timing of the two colors in a common path geometry are also possible. The polarization (direction, linear, circular) of the two waves can also be separately manipulated to control the polarization characteristics of the output.

The waveguide used in this work was a "negative curvature" design hollow waveguide with a nominal mode diameter of 30 μm, similar to FIG. 2D. This structured fiber allows for the bulk of the energy of the guided laser mode to travel within the central lobe as a near-TEM$_{oo}$ mode structure. Other types of hollow-geometry fibers may be used instead similarly-see FIGS. 2A-C. These fiber designs have made rapid progress in recent years. The propagation characteristics of these waveguides is covered in numerous publications; however, the common characteristic is that they are very effective at lowering leakage of light from the waveguide compared with the use of a simple hollow capillary tube (as was first described in Marcatili et al. in 1964) The structured waveguide designs of FIGS. 2A-D are manufactured using fiber drawing techniques that can result in very high quality, and leakage losses in these hollow waveguides have proven to be dramatically decreased.

The issues that had to be overcome in the use of these structured waveguides are 1) that the structures are exceedingly thin (<<μm-scale wall thickness), creating questions of how much peak-and-average power can be guided without damage, and 2) that the guiding characteristics of these waveguides exhibits a stronger wavelength dependence, with strong structural resonances that create very high loss for wavelengths in the "stop bands" of these designs. These stop bands also correspond to rapid changes in the phase velocity (and also consequently the group velocity) of light guided at wavelengths near but not within the stop bands. Thus, use of these waveguides for frequency mixing with a broad range of wavelengths was complex to achieve.

Figure 4:
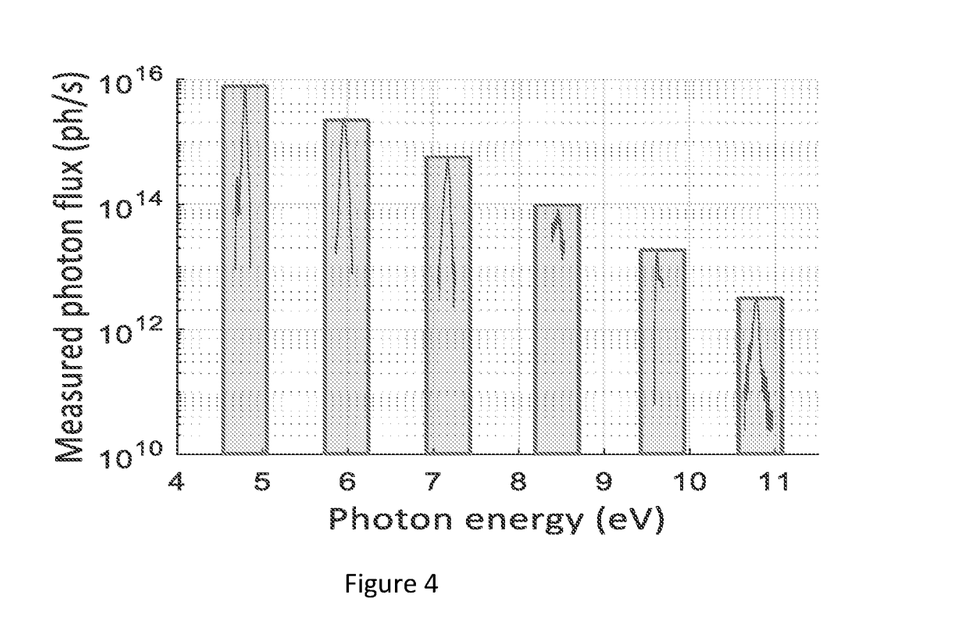
FIG. 4 is a plot showing measured photon flux versus photon energy obtained from implementation of one embodiment of the invention.

The present invention includes the discovery that there is a parameter range where the frequency upconversion is efficient while spectral broadening through self-phase modulation is minimized, resulting in a substantively narrow-band (i.e. $\lambda/\Delta\lambda \gg 10$), near monochromatic coherent light source at short wavelengths. In the present invention, although the dispersion characteristics and pass/stop bands of the hollow waveguide does affect the output, in some implementations it plays a minor role, making it possible to obtain substantial efficiency for upconversion even without detailed design accounting for these resonant and anti-resonant effects: when the wavelengths of interest for a particular wave-mixing frequency conversion process are all away from any of the loss resonances of the structured waveguide, the waveguide dispersion can productively be considered as simply that for a hollow capillary waveguide, allowing for general guidance as to the optimal conditions for phase matching of the process. As a generalization, waveguiding losses in hollow capillaries fall very quickly with shorter wavelength of the light. In a simple capillary guide, the loss coefficient scales as $$\alpha = \left(\frac{u_{nm}}{2\pi}\right)^2 \frac{\lambda^2}{a^3} \left[\frac{\frac{1}{2}(n^2 + 1)}{\sqrt{n^2 - 1}}\right]$$

where n is the index of refraction of the material. Thus, the function of the structure in the waveguide is primarily for decreasing the loss of the infrared and visible wavelengths that drive the process, and the shortest wavelengths will often be much less affected by the presence of the waveguide. The propagation of the short wavelengths is primarily influenced by the index of refraction of the gas, allowing for tuning of phase-matching parameters. Once a structured waveguide is chosen that effectively guides the two pump wavelengths, upconversion is then experimentally implemented, and parameters adjusted to optimize the output. This approach has proven effective as shown in the data presented in FIGS. 4, 6, and 7. In this work, the waveguide itself was held straight—this can be done by laying the waveguide in a straight groove, or by gently tensioning the fiber taught. Although structured waveguides are generally designed to tolerate bending, this only applies to the design wavelength, and may or may not apply to the shorter upconverted wavelengths. The lengths required in this work ~10-30 cm were short enough that holding the waveguide straight was not inconvenient. However, design of extremely broad bandwidth low bending loss structured waveguides may allow for the waveguide to be coiled and to make use of very long interaction lengths that allow for more efficient conversion or conversion of lower peak-power pulses or perhaps even continuous-wave light.

However, we would note that explicit design of waveguides to propagate all or most of the wavelengths involved in the upconversion can also be of advantage. For example, in negative curvature waveguides, the stop- and pass-bands are generally uniformly spaced in optical frequency. This fact can be used to design a waveguide or choose a set of wavelengths that can transmit a series of successive spectral peaks, as generated though the four-wave mixing upconversion process, to optimize its use for cascaded upconversion. This design could include both a consideration of loss, and of dispersion, to optimize the efficiency of upconversion.

In the embodiment of FIG. 3A, the process does not rely on plasma generation, so it does not have a minimum energy 'threshold', rather, the minimum input energy required depends primarily on the desired output power. In this setup, when and only when the 1035 nm and the 518 nm light are co-propagating in the wavelength and overlapped in time, we see strong upconversion to all the successive harmonic orders observable with our simple prism setup: $3\omega$ (345 nm), $4\omega$ (259 nm), $5\omega$ (207 nm), $6\omega$ (173 nm), $7\omega$ (148 nm), $8\omega$ (129 nm), $9\omega$ (115 nm). The conversion efficiency, in particular to 345 nm, is quite high, even with substantially lower peak power for the pump pulse. This facilitates upconversion via cascaded 4 wave mixing. Although it is difficult experimentally to distinguish between individual processes (for example, two successive 4-wave missing processes vs a direct 6-wave mixing process), based on the fact that the system only generates substantial VUV with properly-timed 2-color injection (where substantial depletion of the $2\omega$ light emerging from the waveguide is clearly evident by varying the relative timing of the two colors), the likely mechanism is through three tiers of cascaded 4-wave mixing—a process that has only been observed in the hollow structured waveguide. Some example processes are listed below (other combinations, for example using $2\omega$ as the idler wave, can also contribute to signal generation)

Tier 1: 4-Wave Mixing $2\omega+2\omega-\omega=3\omega$

Tier 2: Cascaded 4WM:

$3\omega+2\omega-\omega=4\omega$ $3\omega+3\omega-\omega=5\omega$

Tier 3: Cascaded 4WM:

$3\omega+4\omega-\omega=6\omega$ $4\omega+4\omega-\omega=7\omega$ $5\omega+4\omega-\omega=8\omega$ $5\omega+5\omega-\omega=9\omega$ FIG. 3B illustrates an embodiment using a pressure gradient 330 within the frequency conversion waveguide 310, that serves to successively phase-match subsequent stages of upconversion in the cascade, as the laser propagates through the waveguide, upconverting first into the UV, then the deep-UV and finally the VUV. The pressure gradient is controlled by changing the pressure of the gas at the input side of the fiber, as well as the length of the fiber, with the output of the fiber in vacuum. Further control is possible by pressurizing the output side of the fiber as well, with the same or a different gas, so long as this gas does not substantially absorb the generated colors of interest. Finally, more-complex pressure gradients can be created by drilling small gas inlet holes at various positions along the waveguide, thus controlling the pressure at this point (this is already done using simple hollow capillary waveguides, and shown to be possible while minimally disturbing the propagating light mode). Some embodiments generate further harmonics, e.g. use $3\omega$ in place of $2\omega$ injected into the waveguide, or a tunable source such as an optical parametric amplifier (OPA) driven by the 1ω or 2ω laser. FIG. 3B also includes light 312 emerging from structured waveguide 310 being focused using a concave aluminum mirror 314 coated with $MgF_2$, then dispersed through an $MgF_2$ prism 316, allowing detection of various harmonics. A diffraction grating can equivalently be used.

FIG. 4 is a plot showing measured photon flux versus photon energy for the system shown in FIG. 3B. Here, light 312 emerging from structured waveguide 310 is focused using a concave aluminum mirror 314 coated with $MgF_2$, then dispersed through an $MgF_2$ prism 316, allowing reasonable detection throughput to 9ω (115 nm). The focused harmonics illuminate a plate of Ce:YAG that serves as a fluorescent screen. A row of spots is then observed, with some harmonics observable directly by eye. The Ce:YAG was imaged using a CMOS camera and imaging lens. The magnification of the image is calibrated by imaging a fine ruling of known pitch temporarily placed in the place of the Ce:YAG. From this image, the mapping of pixel space into physical coordinates on the Ce:YAG was determined. The field of view of the camera was not sufficient to capture all the harmonic in a single image. Harmonics were imaged in groups (e.g., 4ω & 5ω, 5ω & 6ω, etc.), so that the relative spacing could be maintained within the concatenated image. This was possible for all harmonics except 9ω, as the distance between 8ω and 9ω exceeded the field of view. The 9ω spot was placed based on the measured location of the other harmonics and the layout of the spectrometer.

The lineouts, shown FIG. 4, give an approximate indication of the spectral bandwidth of each spectral peak. The spectral bandwidth in this measurement is in general instrument limited, but the maximum spectral bandwidths of ~20-50 meV correspond well to the spectral bandwidths of the 1035 nm and the 518 nm light (both have ~20-50 meV spectral bandwidth with $\tau_p$~100 fs). These data illustrate a distinct mode of operation with significant conversion efficiency into the VUV but minimal spectral broadening of the individual peaks. This is enabled by the use of two-color driving of the process. This is particularly advantageous for applications in spectroscopy, scatterometry, and imaging that can benefit from near monochromatic light. In other cases, the entire spectrum of discrete peaks may be used effectively. Reductions in bandwidth can be achieved by direct filtering in the monochromator, or by shaping the amplitude and/or phase and/or spectrum of the input pulses to preferentially generate mixing results within a desired band. For example, adjustment of the "chirp" of the input pulses has been observed to be an effective control parameter, and can be adjusted to minimize the observed spectral bandwidth of the desired upconverted light. Furthermore, using a longer duration pulse, with an intrinsically narrower spectral bandwidth, will also result in narrower spectral linewidth of the upconverted light. This lowers the peak power of the pulse, making the upconversion process weaker. However, the low loss of the structured waveguide may well still allow for efficient upconversion even in the case of significantly narrower spectral bandwidths than shown in FIGS. 4 and 6.

Figure 5:
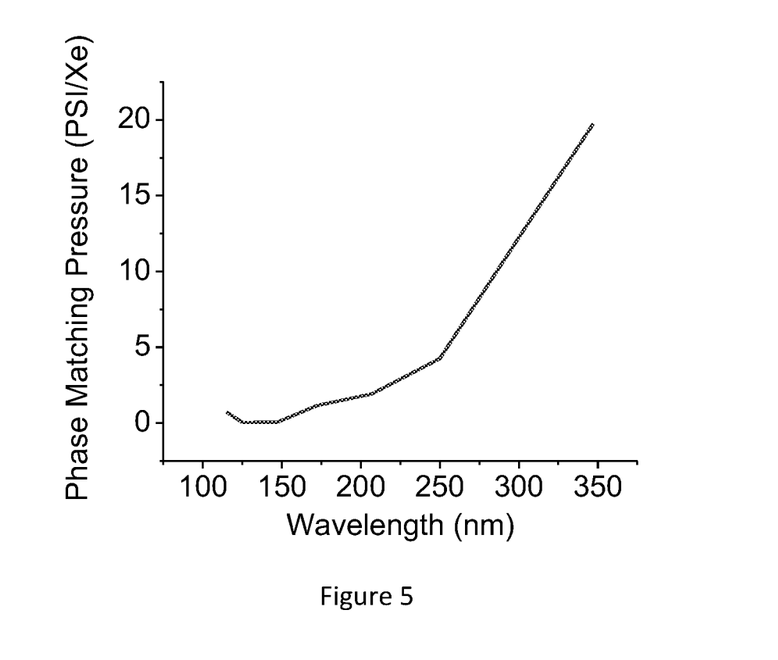
FIG. 5 is a plot showing optimum phase matching pressure calculated for four-wave mixing in an embodiment of the present invention, with the x-axis corresponding to the generated, upconverted, wavelength.

FIG. 5 is a plot showing optimum phase matching pressure for four-wave mixing in an embodiment of the present invention. Optimum phase matching pressure (in psi of Xenon gas) for four-wave mixing upconversion is shown as a function of the generated signal wavelength. Optimum pressure falls with shorter wavelength, making it optimal to use a pressure gradient in the structured waveguide. This can be accomplished by applying a higher pressure at the entrance than at the exit of the waveguide. FIG. 5 shows the results from a calculation of optimum phase matching pressure for (2ω+2ω−ω)=3 ω upconversion in xenon gas, for plotted as a function optimum pressure (y) vs signal (i.e. 3 ω) wavelength. These data show that cascaded frequency conversion processes can be facilitated by the use of a pressure gradient in the waveguide as discussed previously.

Table 1 shows measured estimated power vs wavelength for the setup of FIG. 3B. For 3ω, 4ω, 5ω, and 7ω, direct measurement with a power meter was possible. For 6ω, 8ω, and 9ω, the power was estimated based on the relative fluorescence efficiency of Ce:YAG and the intensity of the spot as observed with the imaging CCD camera. In this case, a 5 cm long, 30 μm mode diameter negative curvature waveguide was pressurized with 14 psi Xenon gas on the entrance and of the waveguide, while the exit was kept at a pressure of $1 \times 10^{-4}$ Torr. 3 W @ 518 nm, and 3 W at 1040 nm, at 1 MHz repetition-rate and a pulse duration of 130 fs (1040), 100 fs (518 nm) were optimally coupled into the waveguide entrance. After the waveguide exit, a lens collimated, and a prism dispersed, the spectrum of the emission to allow for measurement of flux levels. A power meter (Newport) was used to measure the power of 3ω, 4ω, while 5 w and 7ω, were measured with a XUV photodiode, and 6ω, 8ω, and 9ω flux were estimated based on relative fluorescence intensity on a Ce:YAG crystal and captured by a camera.

TABLE 1

| Photon energy (eV) | Harmonic order | λ (nm) | Power (μW) | Flux (Ph/s) |
|---|---|---|---|---|
| 3.6 | 3 | 347 | 200000 | $3.5 \times 10^{17}$ |
| 4.8 | 4 | 257 | 20000 | $2.6 \times 10^{16}$ |
| 6.0 | 5 | 208 | 2000 | $2.1 \times 10^{15}$ |
| 7.2 | 6 | 171 | 300 (est.) | $2.6 \times 10^{14}$ |
| 8.4 | 7 | 147 | 275 | $2.4 \times 10^{14}$ |
| 9.6 | 8 | 129 | 150 (est.) | $1.17 \times 10^{14}$ |
| 11 | 9 | 114 | 100 (est.) | $5.7 \times 10^{13}$ |

Figure 6A:
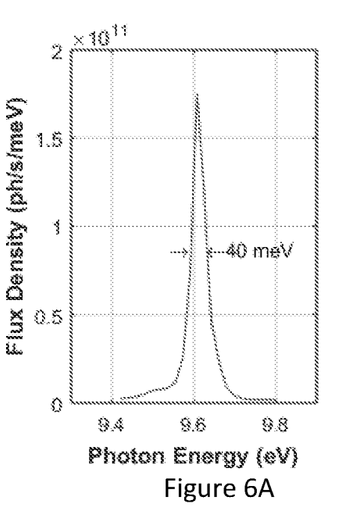
FIG. 6A is a plot illustrating measured spectrum of the $8^{th}$ harmonic, in the same setup as the data of FIG. 4.
Figure 6B:
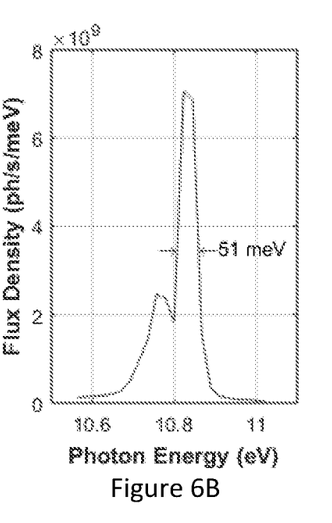
FIG. 6B is a plot illustrating measured spectrum in the $9^{th}$ harmonic at ~10.8 eV. These data illustrate that a multistep cascaded upconversion process can generate significant flux while avoiding nonlinear broadening processes and still retaining a narrow spectral bandwidth.

FIG. 6A is a plot illustrating measured spectra in the $8^{th}$ (129 nm, 9.6 eV) and $9^{th}$ (115 nm, 10.8 eV) harmonic using a Czerny-Turner monochromator with a 25 μm exit slit (not shown). The 30 μm hollow-core fiber serves as the input slit. The light through the slit is measured using an $Al_2O_3$ photodetector. The resolution in this case is limited by the large slit size.

To measure spectral and power output, the output of the hollow-core fiber was collimated using a concave (500 mm ROC) $MgF_2$-coated Al mirror, dispersed using a 1200/mm grating of the same coating, and then focused using another concave mirror (400 mm ROC) of the same coating in a Czerny-Turner configuration. A variable output slit can be used as a spectral filter, selecting a single harmonic, or filtering a harmonic to the desired bandwidth. The grating can be used in either classical diffraction or conical diffraction configurations. By rotating the grating such that the dispersed light sweeps across the slit, and measuring the transmitted light using a photodetector, the spectrum of the harmonics can be measured. Such a scan is shown in FIG. 6 for the eighth and ninth harmonics, as measured using a 25 μm slit and an $Al_2O_3$ photodetector. The photocurrent is measured using an ammeter and scaled by the typical responsivity to estimate the photon flux at the detector surface. The wavelength axis is constructed from the measured rotation angle of the grating and the geometry of the monochromator. The flux is then further scaled to a 1 meV bandwidth, as shown. The resolution of the spectrometer is clearly limited in this case by the size of the slit used in these data.

Figure 7A:
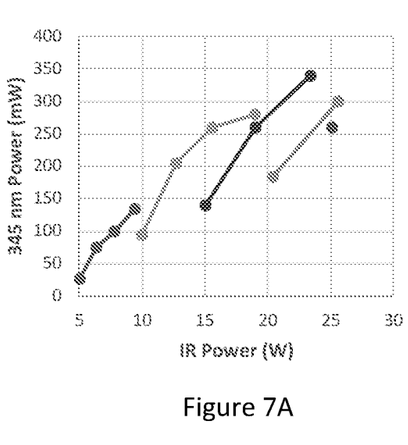
FIG. 7A is a plot illustrating third harmonic power for a variety of repetition rates.
Figure 7B:
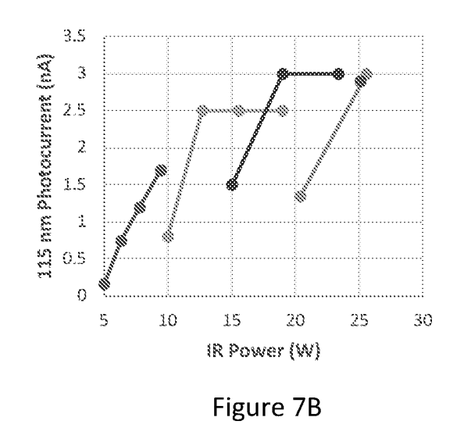
FIG. 7B is a plot illustrating ninth harmonic power for a variety of repetition rates. The x-axis in each case corresponds to the power generated by the laser at ~1035 nm. This light was in this case frequency doubled, with the two colors injected time-coincident into the structured waveguide.

FIG. 7A is a plot illustrating third harmonic power for a variety of repetition rates. FIG. 7B is a plot illustrating ninth harmonic power for a variety of repetition rates. 1 MHz (leftmost curve), 2 MHz (next curve), 3 MHz (next curve), 4 MHz (rightmost curve) and 5 MHz (dot).

The output power was measured as a function of repetition rate. The 345 nm power was measured using a thermal power meter, while the $9^{th}$ harmonic was again measured using an NIST-calibrated $Al_2O_3$ vacuum photodetector. The Xenon pressure was held at 16.5 PSIa. The IR power was varied such that approximately the same pulse energy was used at each repetition rate, from 5 µJ to 9.5 µJ. The average power into the fiber was limited to 25 W to avoid heating. The time delay between the green and IR light was optimized at each power level. The pulse compression remained constant throughout.

Generally, in this work, the mode quality of the output wavelengths was observed to be excellent—near $TEM_{00}$. However, there are some cases where upconversion into higher order modes was observed—for example when two colors were injected into the fiber filled only with air at ambient pressure, the 3w signal was observed to be emitted with a $TEM_{10}$ double-lobed mode. Filling the waveguide with (high index of refraction, above-ambient pressure) xenon clearly improved phase-matched conversion to $TEM_{00}$, resulting in a $TEM_{00}$ emission mode. This was true even when the exit of the fiber was into ambient air conditions; even in this case, the gas usage in this apparatus was found to be very low due to the low conductance of these small diameter structured waveguides.

The approach described in the previous section uses "non-resonant" nonlinear optics, meaning that this approach can be used with any combination of input wavelengths (for example, tunable mid-infrared and/or visible wavelengths) to generate any output in this general range. It should be noted, however, that in some cases resonant enhancement of the nonlinear coefficients allows for narrowband radiation to be generated, with potential advantages of either a simpler implementation or higher efficiency—these implementations may similarly benefit from the use of structured fibers to confine the driving laser light.

While the exemplary preferred embodiments of the present invention are described herein with particularity, those skilled in the art will appreciate various changes, additions, and applications other than those specifically mentioned, which are within the spirit of this invention.

What is claimed is:

1. Apparatus for upconverting light by wave-mixing comprising:
   a hollow waveguide fabricated with internal structure designed to suppress loss for light propagation;
   means for time-coincident injection of two coherent light inputs into the structured waveguide, the two coherent light inputs having distinct colors;
   wherein the ratio of waveguide diameter to wavelength of the longer-wavelength color of coherent light input is less than 100; and
   wherein the coherent light inputs are selected with wavelengths and peak power sufficient to result in frequency upconversion resulting in output light having a higher wavelength than either of the input light wavelengths and having intensity of at least 5% of the coherent light inputs combined intensities.

2. The apparatus of claim 1 wherein the coherent light inputs are chosen to result in cascaded upconversion.

3. The apparatus of claim 2 wherein the coherent light inputs are selected such that the cascaded upconversion has multiple tiers and the output light is several times shorter in wavelength than the wavelength of the shorter-wavelength color of coherent light input.

4. The apparatus of claim 1 wherein one coherent light input is pulsed with pulse duration >100 femtoseconds.

5. The apparatus of claim 4 wherein both coherent light inputs are pulsed with pulse duration greater than 100 femtoseconds.

6. The apparatus of claim 1 wherein one coherent light input is pulsed with pulse duration greater than 1 ps.

7. The apparatus of claim 1 wherein each coherent light input possesses peak intensity and average power low enough to avoid damage to the waveguide, and wherein both colors of coherent light input must be present to drive the frequency upconversion process at an efficiency of at least 5%.

8. The apparatus of claim 1 wherein the coherent light inputs are pulsed and wherein the pulse energy is <10 microjoules for each coherent light input.

9. The apparatus of claim 8 wherein the pulse repetition rate for each coherent light input is 0.5 MHz or greater.

10. The apparatus of claim 1 wherein the output light comprises coherent vacuum-ultraviolet (VUV) coherent emission with spectral bandwidth between 10 meV and 100 meV.

11. The apparatus of claim 1 wherein the coherent light inputs propagate in the waveguide in their lowest-order, near-gaussian spatial modes.

12. The apparatus of claim 1 wherein the output light is generated in a low-order near-gaussian mode.

13. The apparatus of claim 1 further comprising means for maintaining the gas in the waveguide at a pressure gradient along the length of the waveguide.

14. The apparatus of claim 13 wherein the means for maintaining includes holes in the waveguide for gas insertion.

15. The apparatus of claim 13 wherein the means for maintaining includes injecting a gas at an entrance of the waveguide and injecting a different gas at an exit of the waveguide.

16. The apparatus of claim 1 wherein one coherent light input is pulsed and further comprising means for applying chirp to the pulses.

17. The apparatus of claim 1 wherein the waveguide is held straight to avoid bending losses.

18. The method of upconverting light by wave-mixing comprising the steps of:
    fabricating a hollow waveguide with internal structure designed to suppress loss for light propagation;
    time-coincident injecting of two coherent light inputs into the structured waveguide, the two coherent light inputs having distinct colors;
    wherein the ratio of waveguide diameter to wavelength of the longer-wavelength color of coherent light input is less than 100; and
    selecting the coherent light inputs with wavelengths and peak power sufficient to result in frequency upconversion resulting in output light having a higher wavelength than either of the input light wavelengths and having intensity of at least 5% of the coherent light inputs combined intensities.

19. The method of claim 18 further including the step of choosing the coherent light inputs to result in cascaded upconversion.

20. The method of claim 19 wherein step of choosing further selects the coherent light inputs such that the cascaded upconversion has multiple tiers and the output light is several times shorter in wavelength than the wavelength of the shorter-wavelength color of coherent light input.

21. The method of claim 18 further including the step of choosing one coherent light input to be pulsed with pulse duration >100 femtoseconds.

22. The method of claim 21 further including the step of choosing both coherent light inputs to be pulsed with pulse duration greater than 100 femtoseconds.

23. The method of claim 18 further including the step of choosing one coherent light input to be pulsed with pulse duration greater than 1 picosecond.

24. The method of claim 18 further including the step of choosing each coherent light input to possesses peak intensity and average power low enough to avoid damage to the waveguide, and wherein both colors of coherent light input must be present to drive the frequency upconversion process at an efficiency of at least 5%.

25. The method of claim 18 further including the step of choosing the coherent light inputs to be pulsed and wherein the pulse energy is <10 microjoules for each coherent light input.

26. The method of claim 25 further including the step of choosing the pulse repetition rate for each coherent light input to be 0.5 MHz or greater.

27. The method of claim 18 wherein the output light comprises coherent vacuum-ultraviolet (VUV) coherent emission with spectral bandwidth between 10 meV and 100 meV.

28. The method of claim 18 further including the step of choosing the coherent light inputs such that they propagate in the waveguide in their lowest-order, near-gaussian spatial modes.

29. The method of claim 18 wherein the output light is generated in a low-order near-gaussian mode.

30. The method of claim 18 further the step of maintaining a gas in the waveguide at a pressure gradient along the length of the waveguide.

31. The method of claim 30 wherein the step of maintaining includes providing holes in the waveguide for gas insertion.

32. The method of claim 30 wherein the step of maintaining includes injecting a gas at an entrance of the waveguide and injecting a different gas at an exit of the waveguide.

33. The method of claim 18 further including the step of choosing one coherent light input to be pulsed and further comprising the step of applying chirp to the pulses.

34. The method of claim 18 further including the step of holding the waveguide straight to avoid bending losses.

* * * * *